Figure 1:
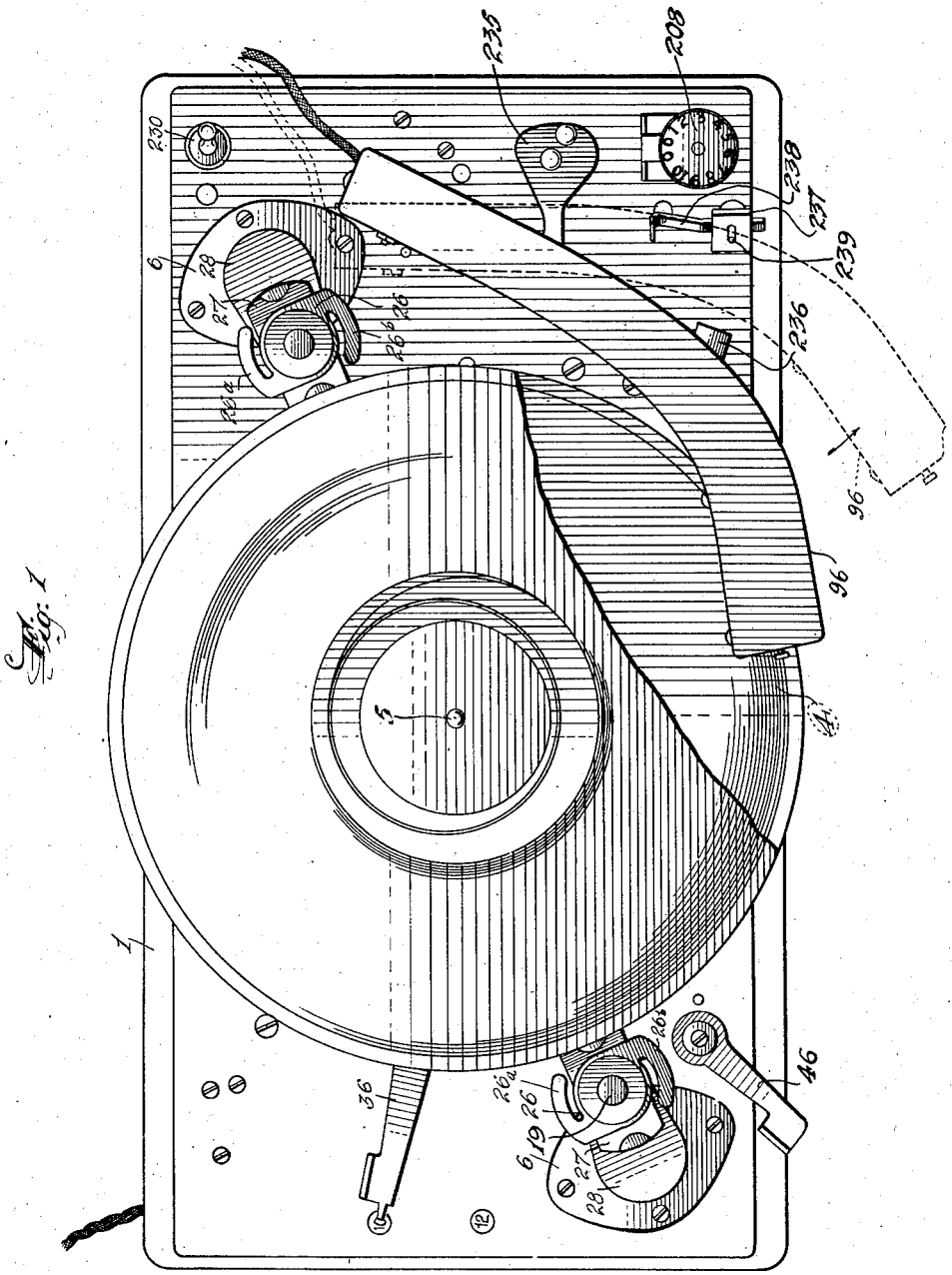

Jan. 20, 1942. P. CATUCCI 2,270,415
PHONOGRAPH
Filed April 6, 1940 17 Sheets-Sheet 1

INVENTOR
Pliny Catucci,
BY Peter C. Fischer.
ATTORNEY

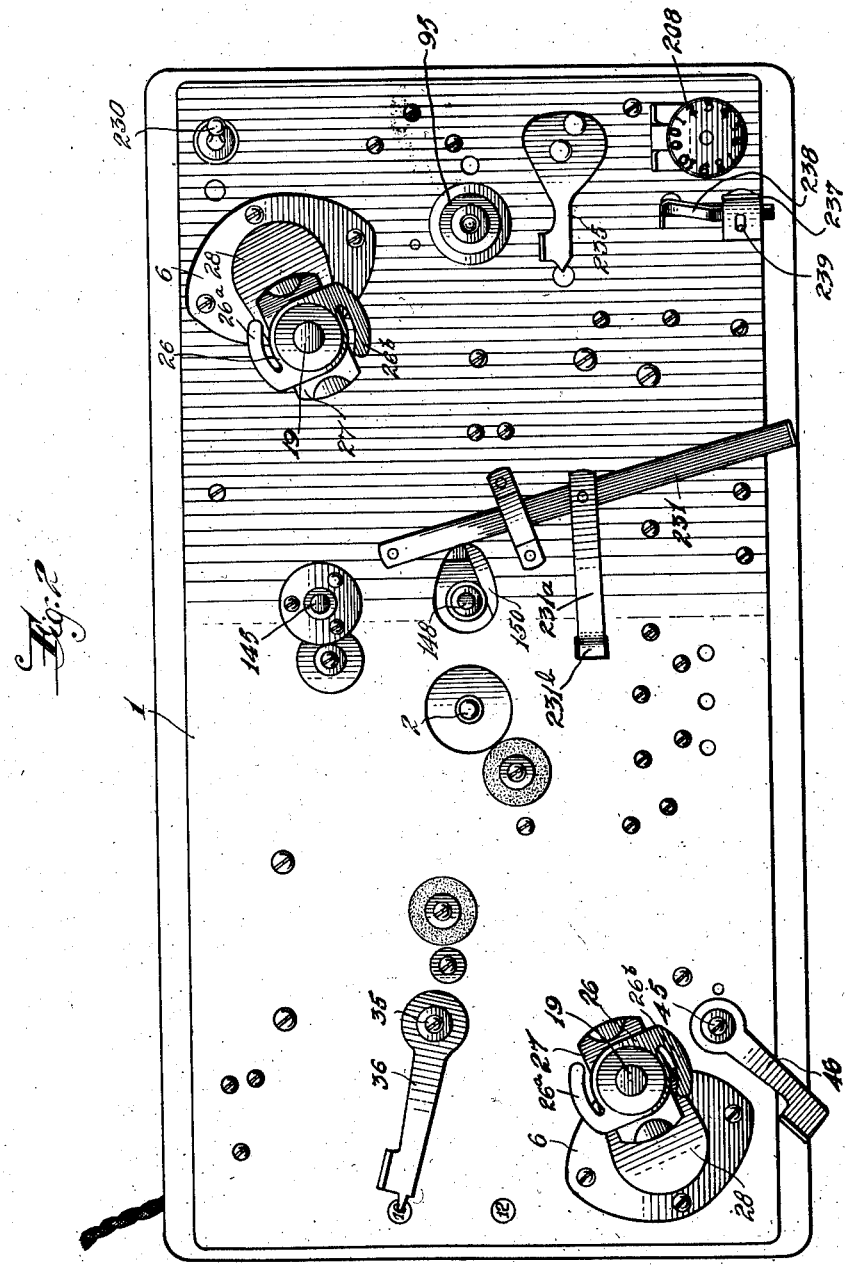

Jan. 20, 1942. P. CATUCCI 2,270,415
PHONOGRAPH
Filed April 6, 1940 17 Sheets-Sheet 3
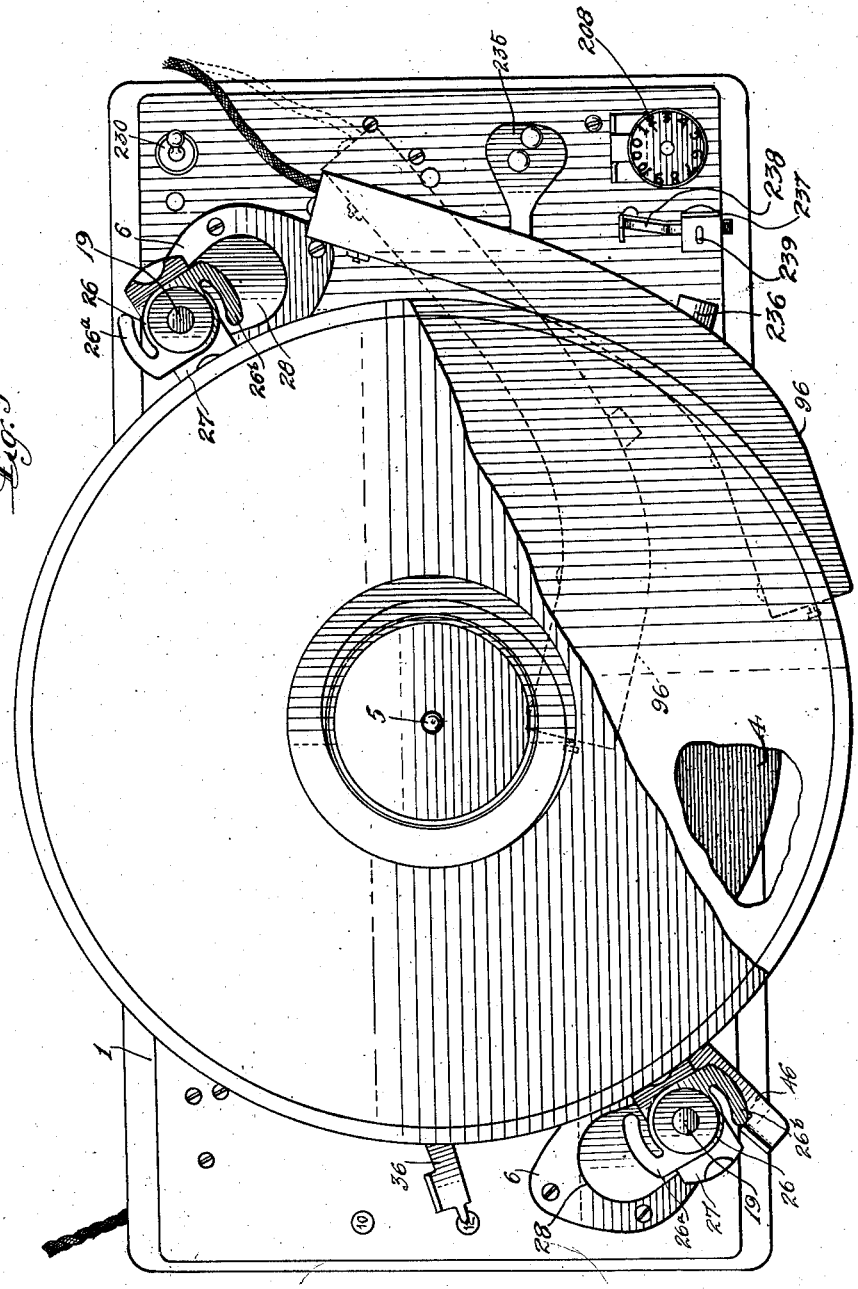
INVENTOR
Pliny Catucci
BY
Fredk C. Fischer
ATTORNEY

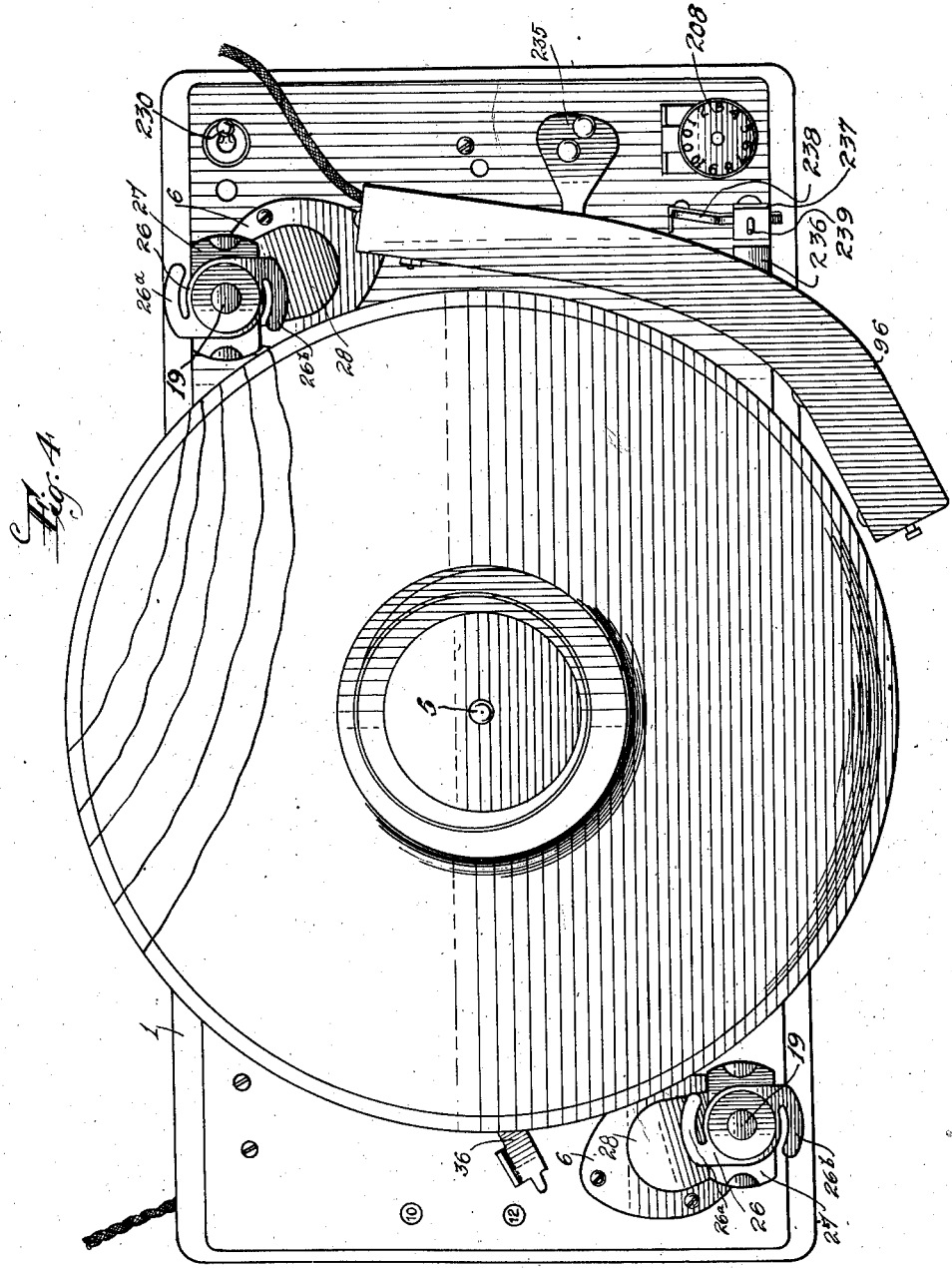

Jan. 20, 1942.　　　　P. CATUCCI　　　　2,270,415
PHONOGRAPH
Filed April 6, 1940　　　17 Sheets-Sheet 5
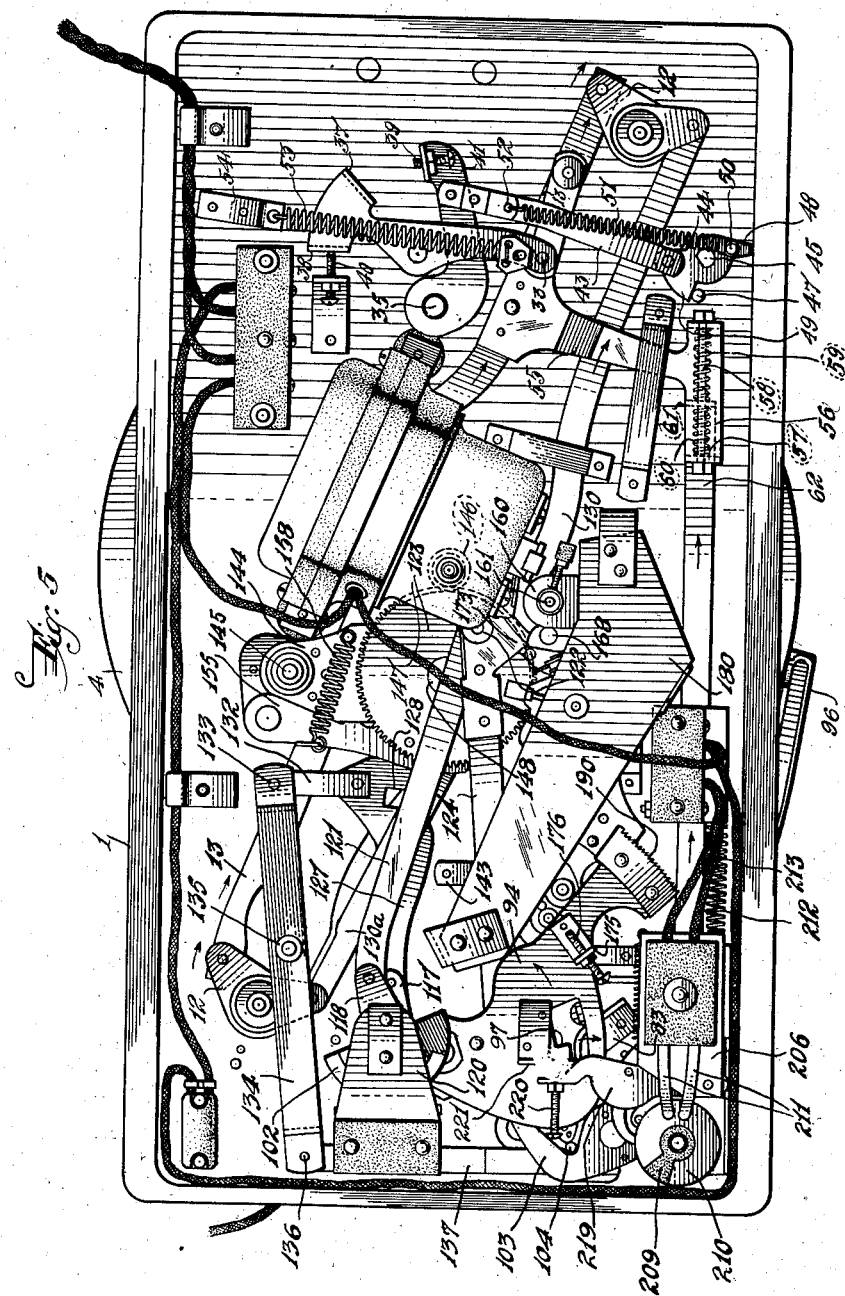
INVENTOR
Pliny Catucci
BY
Fred C. Fischer
ATTORNEY

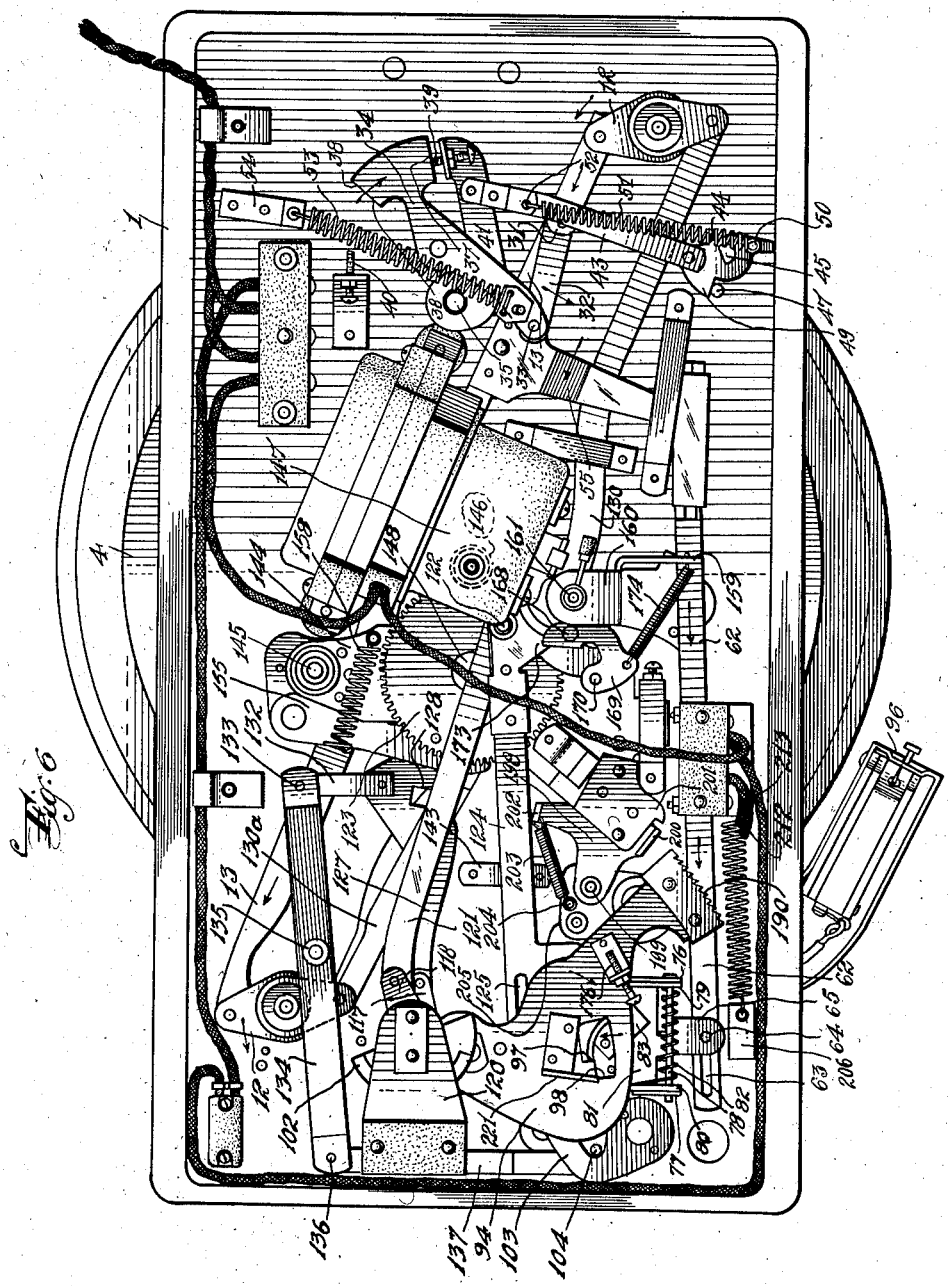

Jan. 20, 1942.   P. CATUCCI   2,270,415
PHONOGRAPH
Filed April 6, 1940   17 Sheets-Sheet 7
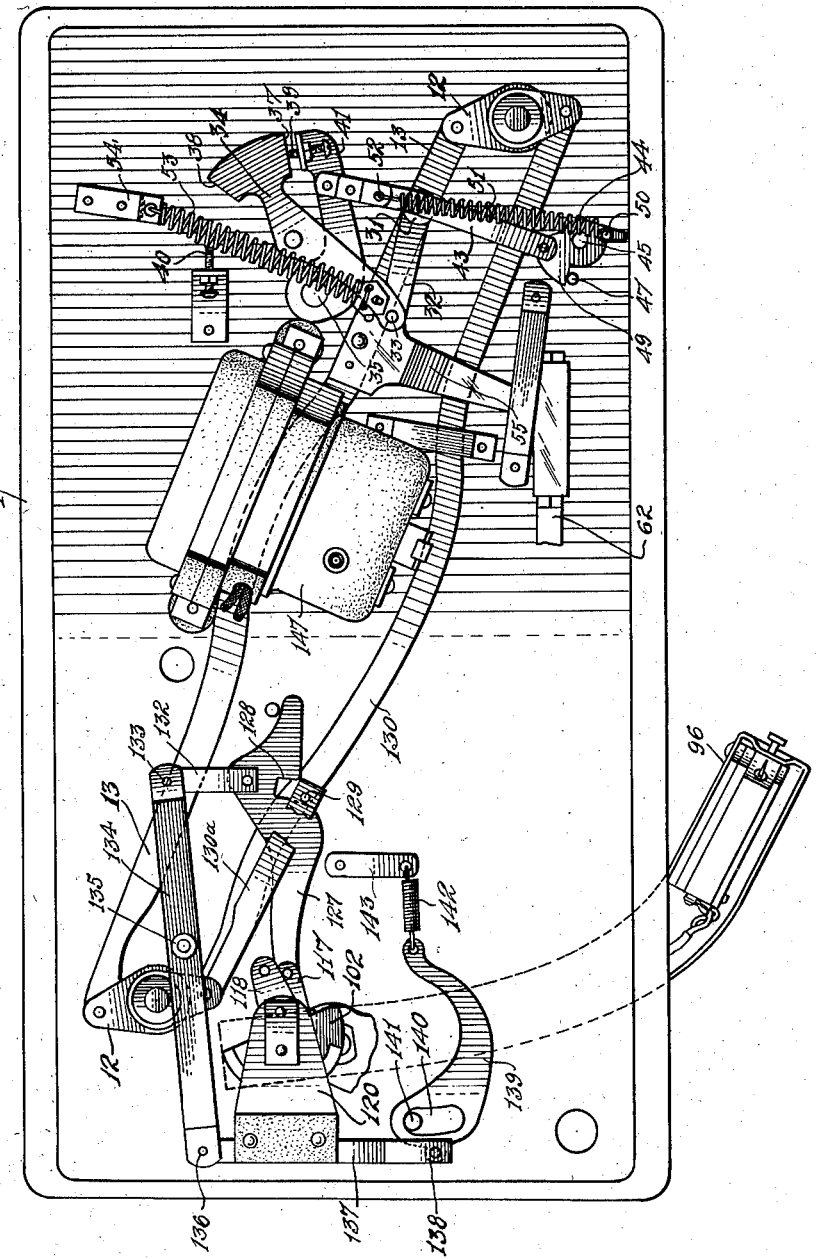
INVENTOR
BY Pliny Catucci,
Fredk C. Fischer.
ATTORNEY

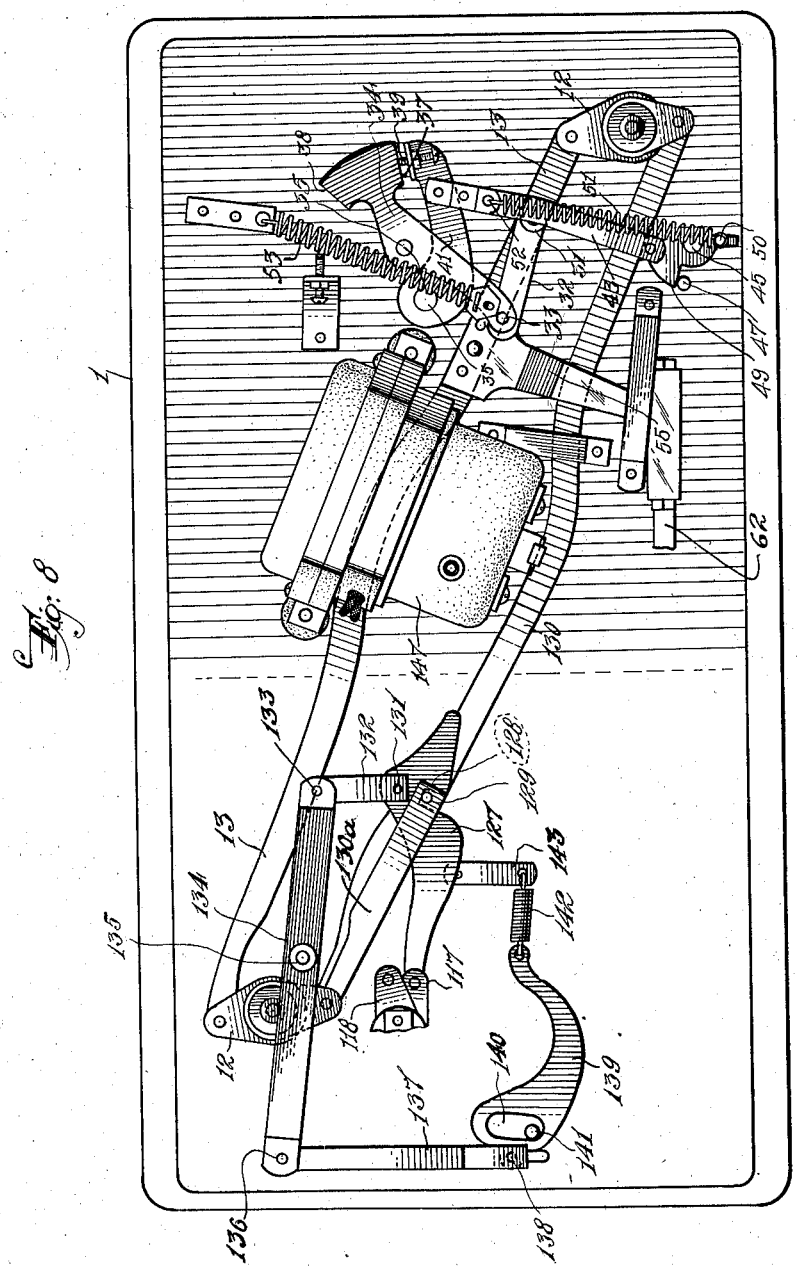

Jan. 20, 1942.    P. CATUCCI    2,270,415
PHONOGRAPH
Filed April 6, 1940    17 Sheets-Sheet 9
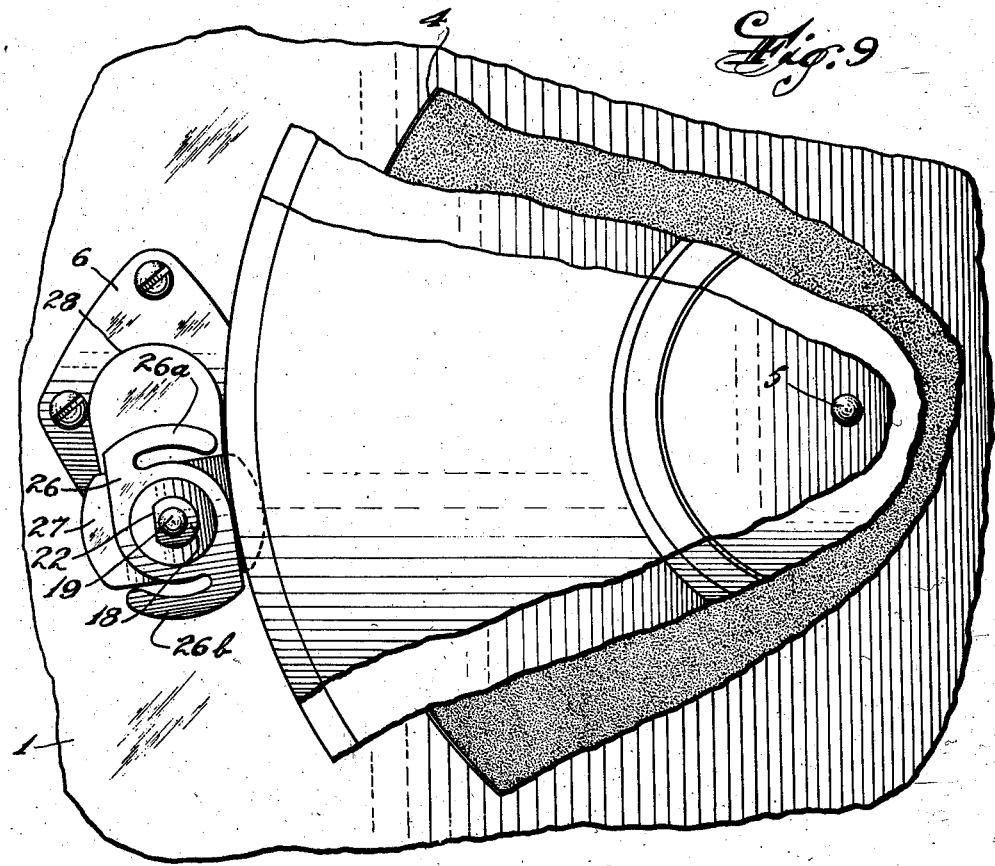
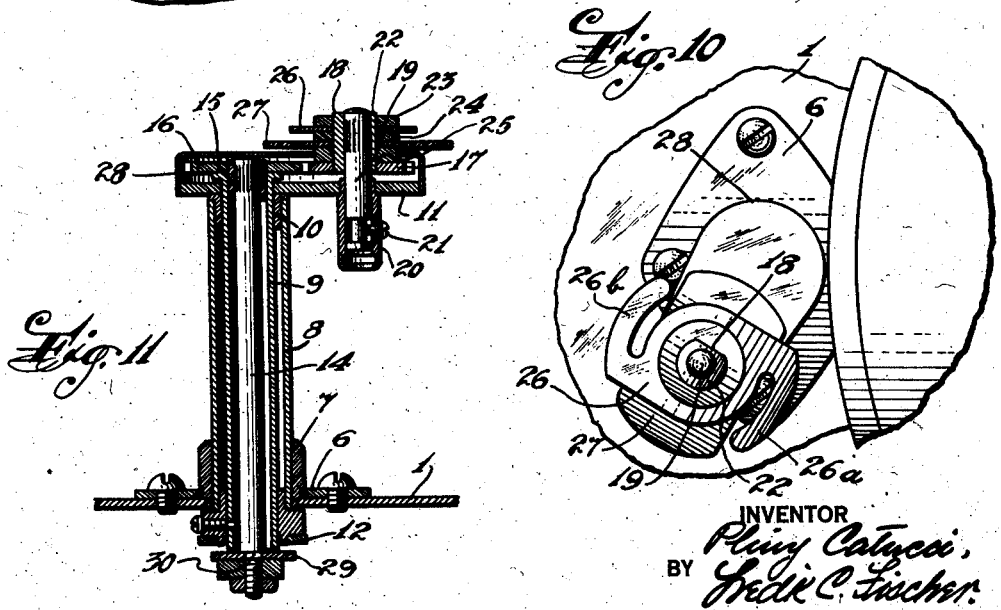
INVENTOR
Pliny Catucci,
BY Fredk C. Fischer
ATTORNEY Jan. 20, 1942.  P. CATUCCI  2,270,415
PHONOGRAPH
Filed April 6, 1940   17 Sheets-Sheet 10

INVENTOR
Plinio Catucci,
BY
ATTORNEY

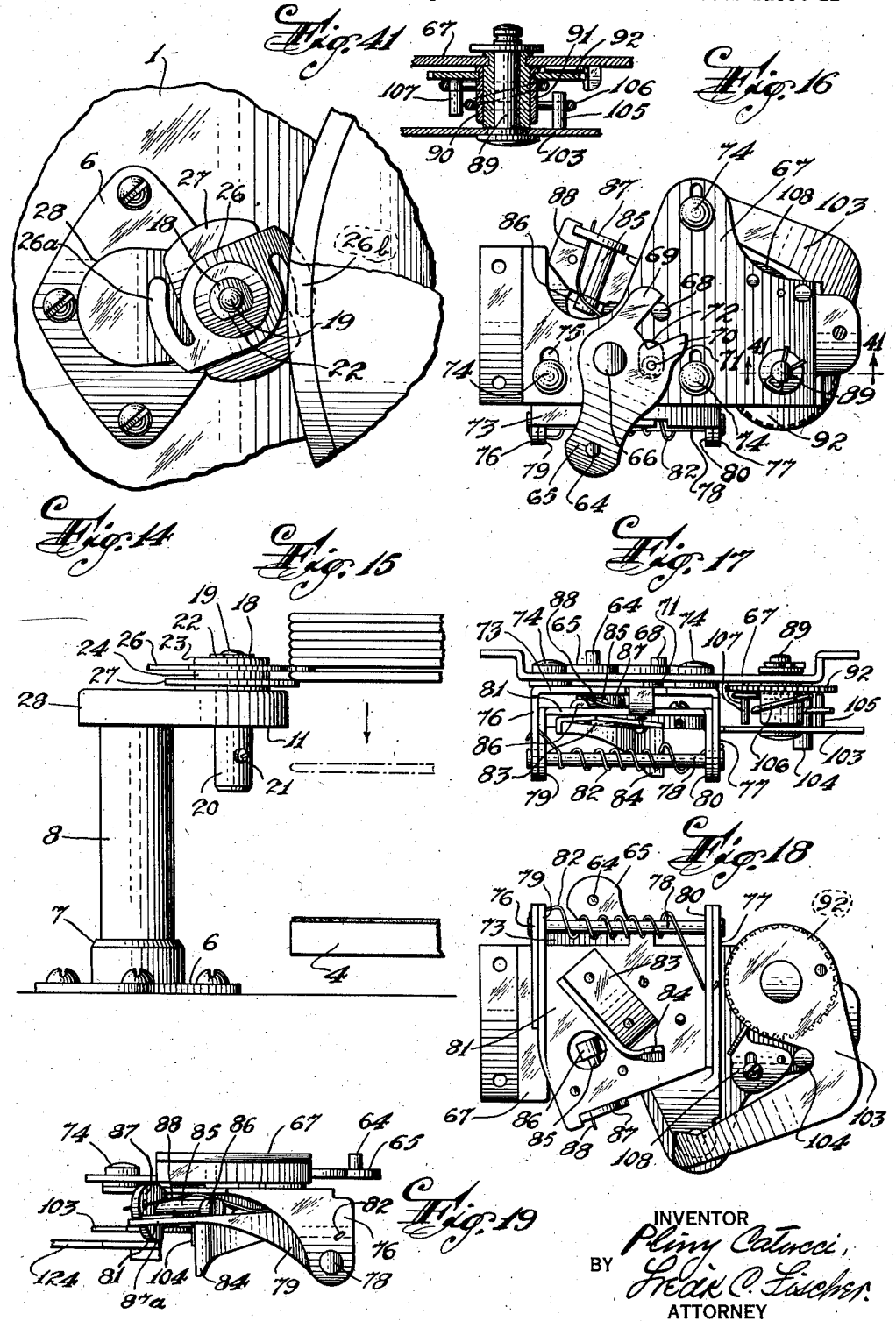

Jan. 20, 1942.  P. CATUCCI  2,270,415
PHONOGRAPH
Filed April 6, 1940  17 Sheets-Sheet 12
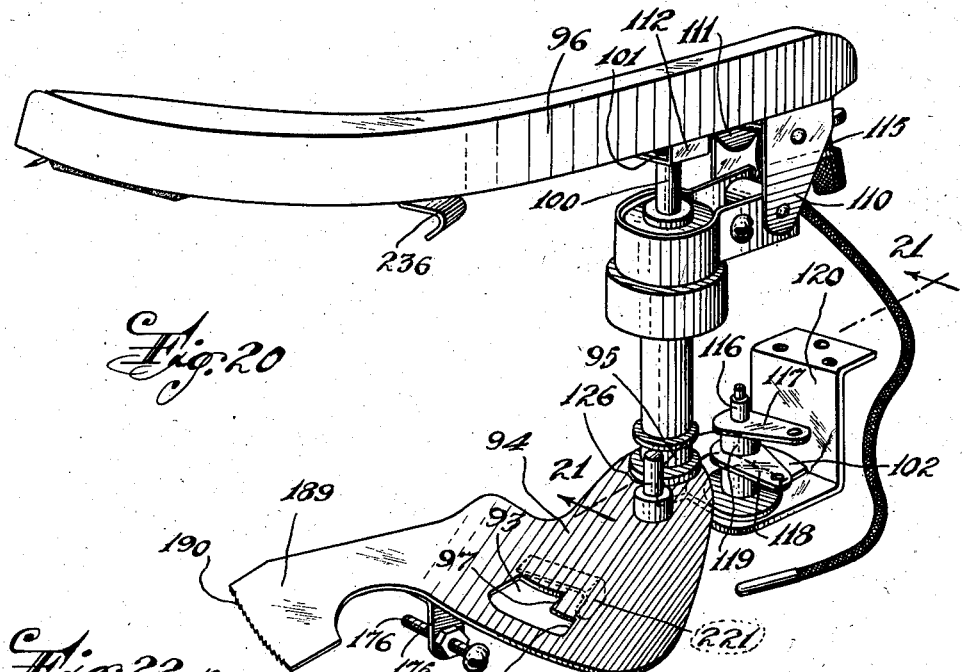
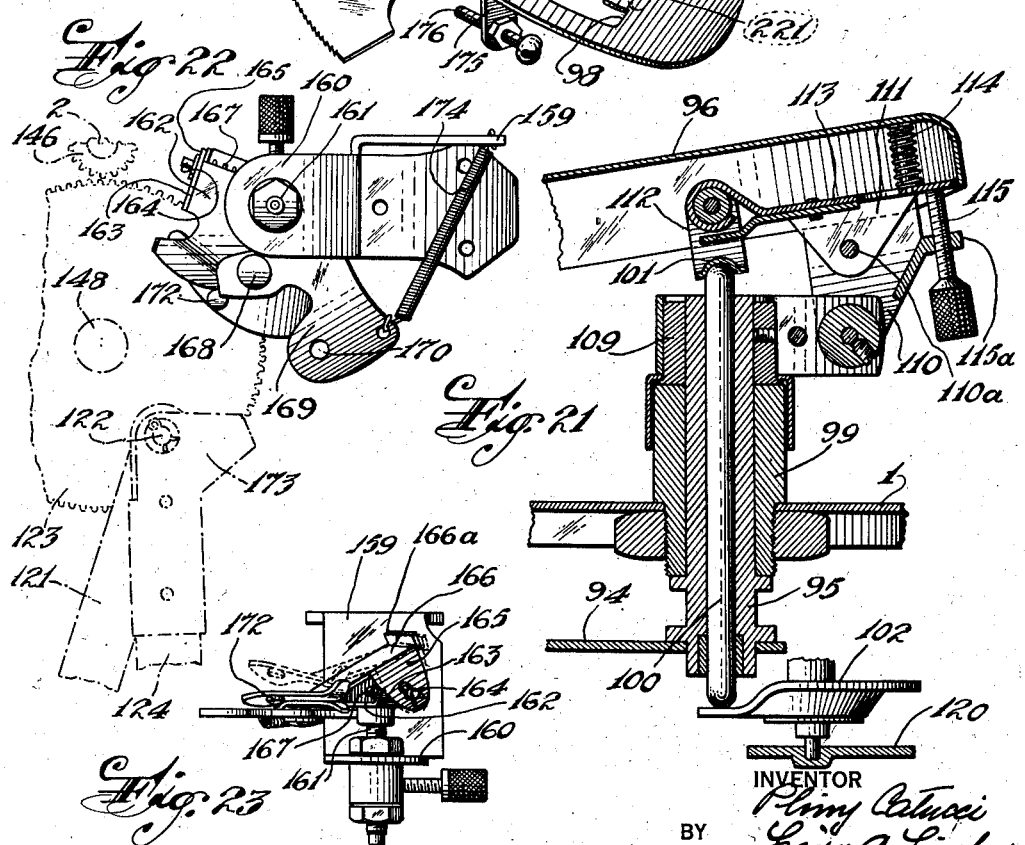
INVENTOR
Pliny Catucci
Fredk C. Fischer
BY
ATTORNEY

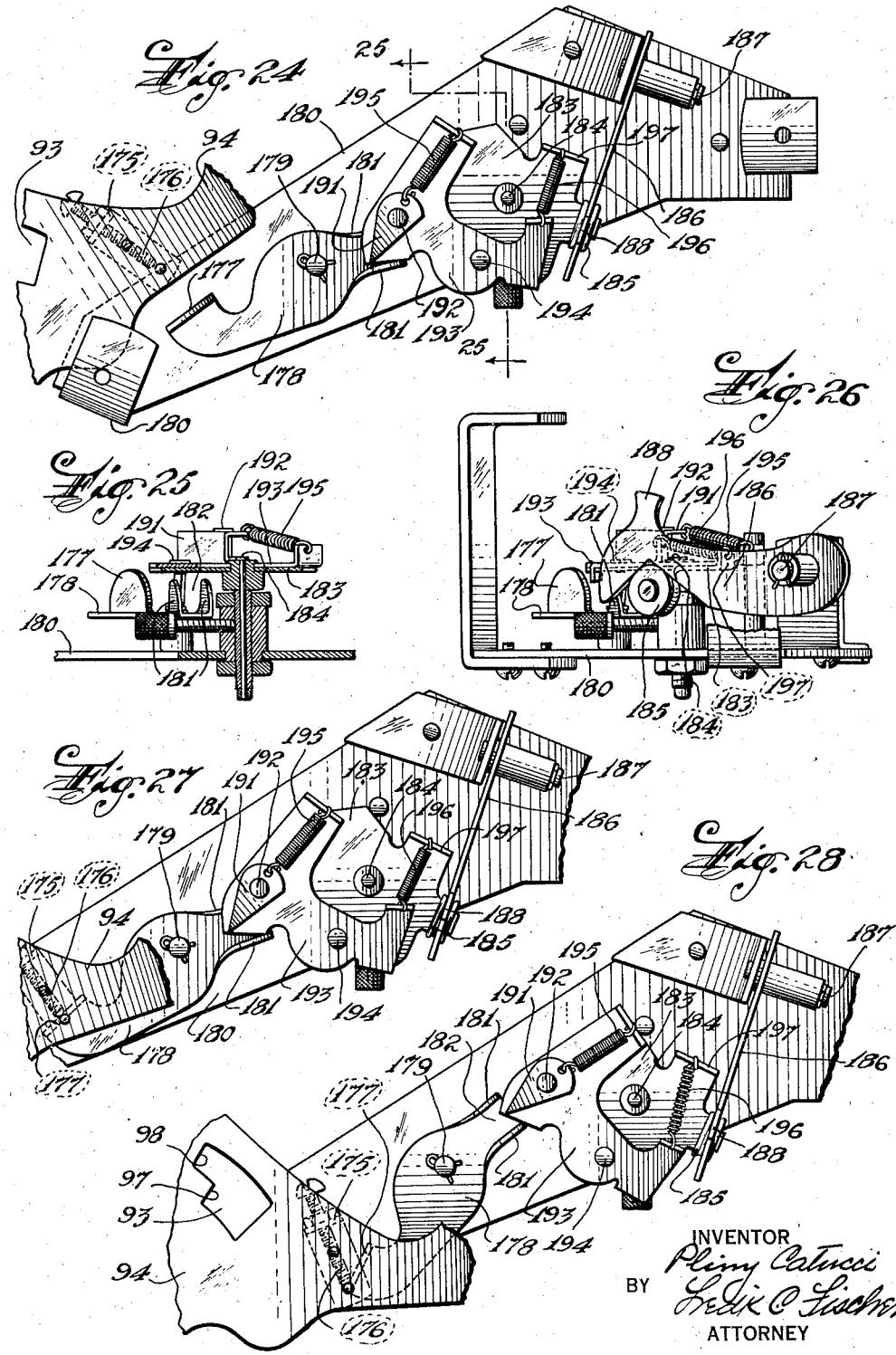

Jan. 20, 1942. P. CATUCCI 2,270,415
PHONOGRAPH
Filed April 6, 1940 17 Sheets-Sheet 14
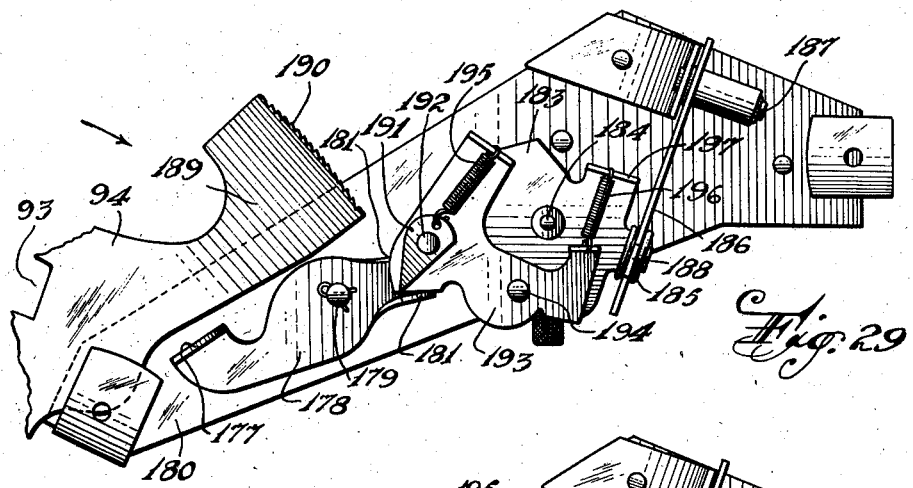
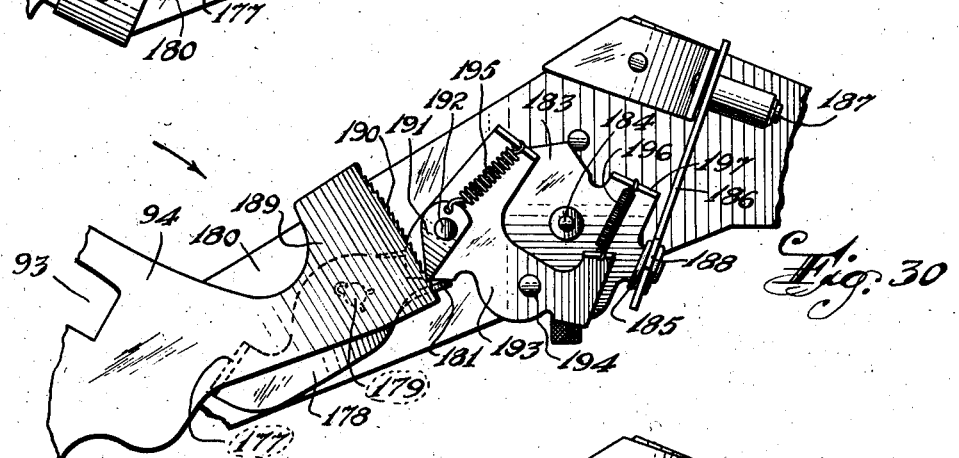
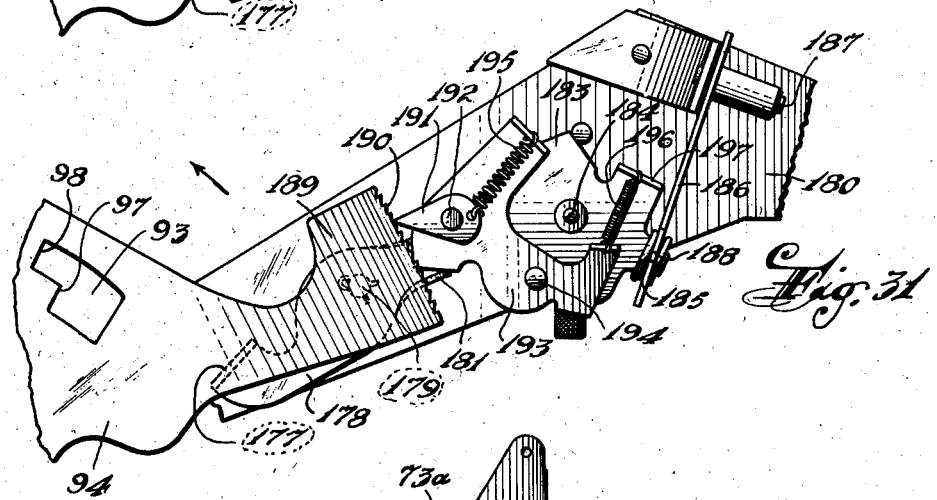
INVENTOR
Pliny Catucci,
BY
Fredk C. Fischer.
ATTORNEY

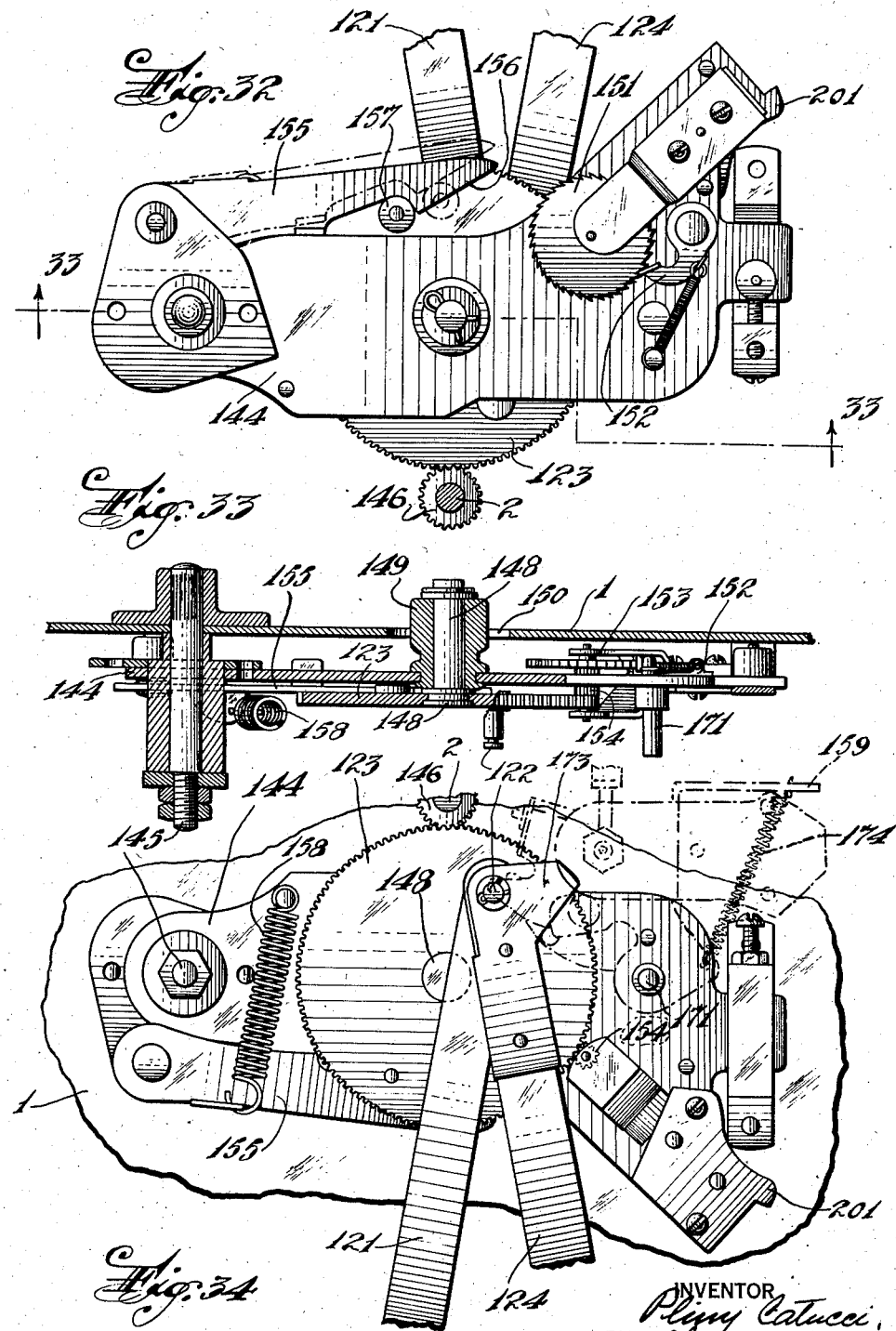

Jan. 20, 1942. P. CATUCCI 2,270,415
PHONOGRAPH
Filed April 6, 1940 17 Sheets-Sheet 16
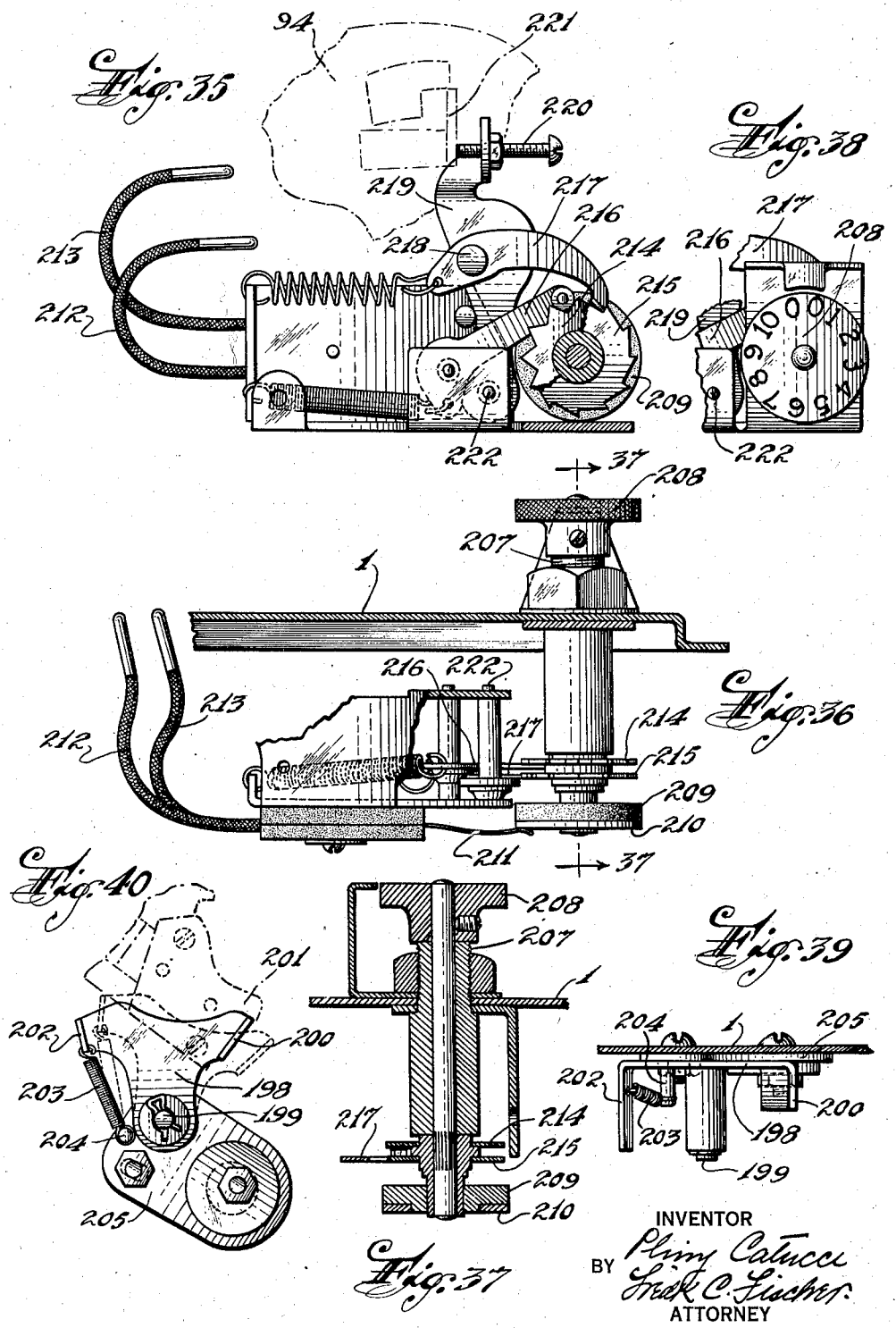

Jan. 20, 1942.    P. CATUCCI    2,270,415
PHONOGRAPH
Filed April 6, 1940    17 Sheets-Sheet 17

INVENTOR
Pliny Catucci,
BY Fredk C. Fischer
ATTORNEY

Patented Jan. 20, 1942

2,270,415

UNITED STATES PATENT OFFICE 2,270,415

PHONOGRAPH

Pliny Catucci, Newark, N. J.

Application April 6, 1940, Serial No. 328,180

6 Claims. (Cl. 274—10)

This invention relates to improvements in phonographs, and more particularly to the provision of a mechanism which enables a plurality of records to be played in succession automatically.

Heretofore, mechanisms for automatically playing several phonograph records in succession have been adapted to accommodate records of one size only. The usual phonograph records are either 10" or 12" in diameter, and accordingly, it is an object of my invention, to provide means to enable the playing of either 10" or 12" records as may be desired without altering the mechanism for automatically playing records in succession.

The 12" phonograph record has a greater thickness than the 10" record and in mechanical record changers of the so-called "drop" type, this difference in thickness has presented a serious problem and a source of great inconvenience.

It is a further object of my invention to provide means to compensate for the difference in thickness of records of different diameters so that the inconvenience heretofore caused by such difference in thickness has been eliminated.

A further object is the provision of an apparatus for repeatedly playing the same record, said apparatus being adapted to be set to accommodate a 10" record or a 12" record.

A further object is the provision of an apparatus for playing a plurality of phonograph records successively, which apparatus is controlled by the position of the tone arm of a phonograph at the completion of the playing of a record.

A further object of this invention is the provision in a phonograph apparatus of means for setting the apparatus to play a predetermined number of records, and insure that the apparatus will cease operation after the playing of the predetermined number of records. By means of my setting device, a phonograph apparatus for automatically playing a plurality of records consecutively, can be set to play a definite number of records and no further attention to the apparatus is required.

Heretofore, in record changing devices of the "drop" record type, there has been provided some sort of means for guiding the records on to the turntable, such guiding means in some instances comprising a guide pin loosely fitting in a socket in a drive shaft. In removing the records this guide pin is withdrawn from the socket, and repeated withdrawing of the guide pin causes it to wear rapidly to such an extent that it will soon start to wobble and will not hold a stack of records in proper concentricity.

It is, therefore, a further object of this invention to provide a guide pin for holding phonograph records in a proper concentric relation, the guide pin being attached to a centering shaft in a substantially permanent manner, such as by screwing the pin into a threaded socket in the shaft, or by using a bayonet slot arrangement.

Figure 12:
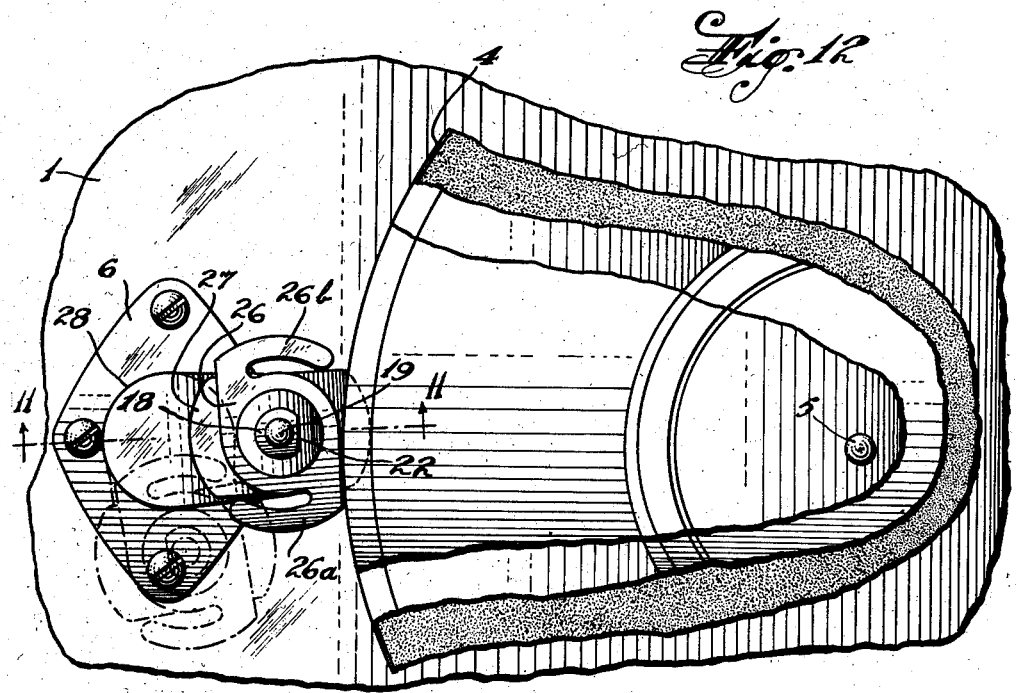
Figure 13:
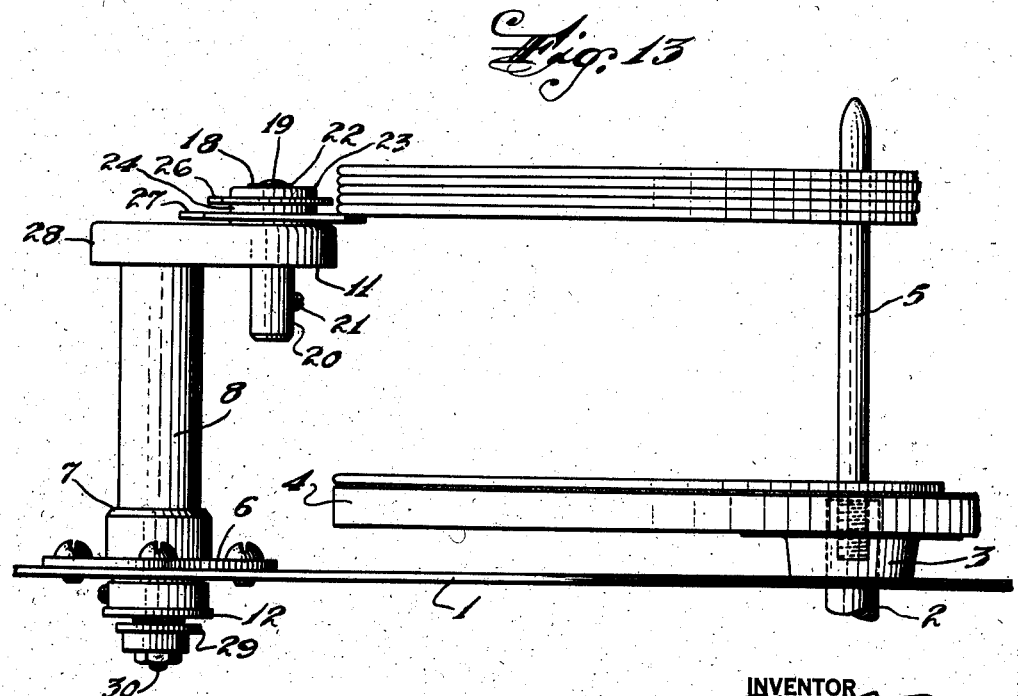
Figure 43:
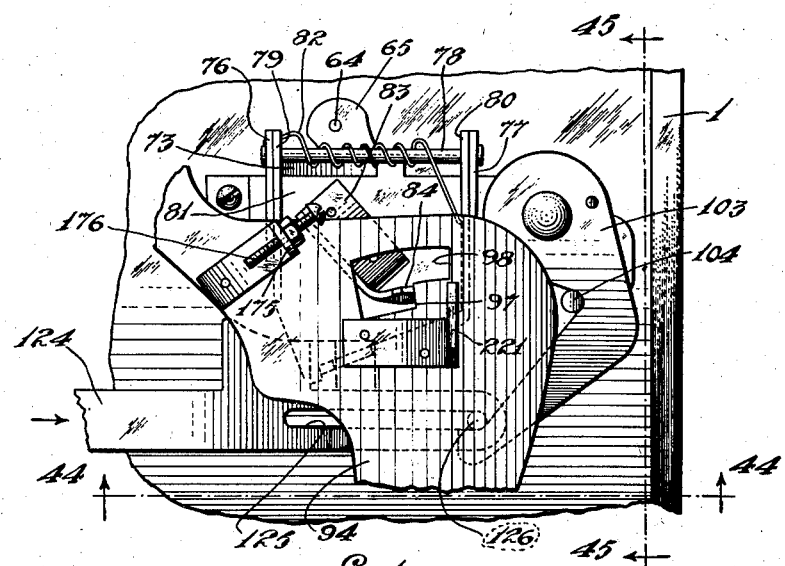
Figure 44:
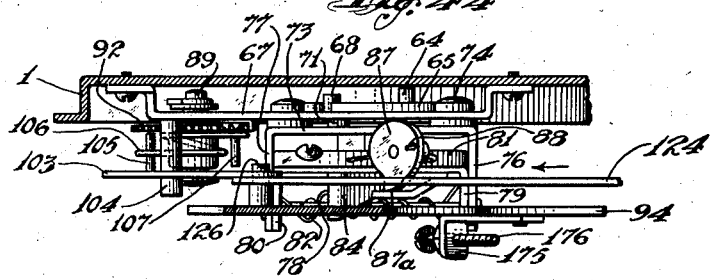
Figure 45:
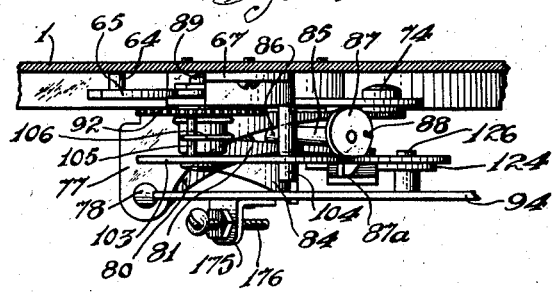

These and other advantageous objects, which will later appear, are accomplished by the simple and practical construction and arrangement of parts hereinafter described and exhibited in the accompanying drawings, forming part hereof, and in which:

Fig. 1 is a plan view of the base plate, having a rotating table mounted thereon, supporting a 10" record with eccentric finishing grooves, Fig. 2 is a top plan view of a base plate used in the device embodying my invention, with parts removed for the sake of clarity, Fig. 3 is a view similar to Fig. 1 showing the base plate supporting a 12" record, having a spiral finishing groove, Fig. 4 is a view similar to Fig. 3 but showing the device set for the removal of the 12" records, the records in this case having a spiral finishing groove ending in an eccentric, Fig. 5 is a plan view of the mechanism supported on the underside of the base plate shown in Fig. 2, showing the device set for a 10" record, Fig. 6 is a view similar to Fig. 5, showing the mechanism in position to accommodate 12" records, Fig. 7 is a bottom view of the base plate with a number of the parts removed, in order to show the essential parts for the shifting of the record holders, Fig. 8 is a view similar to Fig. 7 showing a bottom view of the base plate showing other details, Fig. 9 is a plan view of a device for supporting records above the turntable, the device in position to accommodate 12" records, Fig. 10 is a plan view showing the device in Fig. 9 moved to a position to allow a record to be removed from the turntable, Fig. 11 is a cross-sectional view of a supporting post and shafts for operating the device shown in Fig. 9, taken on line 11—11 of Fig. 12, Fig. 12 is a plan view further disclosing the operation of the device in Fig. 9, on a 10" record, Fig. 13 is a side elevational view of a post shown in Fig. 11, and the device shown in Fig. 12, Fig. 14 is a plan view of the device shown in Fig. 12, showing a step in the selection of a record prior to the dropping of the record upon a turntable, Fig. 15 is a side elevational view of a supporting post and the device shown in Fig. 14, showing a record being dropped and the device moved into the position to support a stack of records, Fig. 16 is a plan view of a detent device for controlling the movements of the tone arm of a phonograph, Fig. 17 is a side view of the device shown in Fig. 16, Fig. 18 is a bottom view of the device shown in Fig. 16, Fig. 19 is an end view of the device shown in Fig. 16, Fig. 20 is a perspective view of a tone arm for a phonograph and control parts associated therewith, Fig. 21 is a sectional view taken on line 21—21 of Fig. 20, Fig. 22 is a plan view of a device for controlling an actuating gear, Fig. 23 is an elevational view of the device shown in Fig. 22, Fig. 24 is a plan view showing one position of a detent releasing device, Fig. 25 is a sectional view taken on line 25—25 of Fig. 24, Fig. 26 is an elevational view of the device shown in Fig. 24, Figs. 27, 28, 29, 30 and 31 show the various positions of a detent releasing device, during the operation thereof, Fig. 32 is a plan view of a mechanism for operating the record releasing device, and for moving the tone arm to the desired position, Fig. 33 is a sectional view taken on line 33—33 of Fig. 32, Fig. 34 is a view of the underside of the device shown in Fig. 32, Fig. 35 is a bottom view of the counting device which is employed in connection with the apparatus, Fig. 36 is an elevational view of the device shown in Fig. 35, Fig. 37 is a sectional view taken on line 37—37 of Fig. 36, Fig. 38 is a plan view of a portion of the counting device, Fig. 39 is a side view of a device associated with the operating gear, Fig. 40 is an under plan view of the device shown in Fig. 39, Fig. 41 is a sectional view on line 40—40 of Fig. 16, Fig. 42 is a plan view of the plate 73 in Fig. 16, Fig. 43 is a bottom plan view of members of the device for controlling a tone arm, Fig. 44 is a sectional view taken on line 44—44 of Fig. 43, and Fig. 45 is a sectional view taken on line 45—45 of Fig. 43.

Referring to the drawings, in Figs. 1 and 2, the apparatus is shown to comprise a base plate 1 having passing therethrough a shaft 2 which is adapted to engage frictionally a bushing 3 on a rotary turntable 4. The cylindrical shaft 2 has at the upper end thereof a threaded recess adapted to threadedly receive the lower end of the guide pin 5, see Fig. 13, which is adapted to guide falling records into position on the turntable 4. Attached to the base plate 1 and diametrically arranged with reference to the turntable, are plates 6 having bushings 7 (see Fig. 11), which support columns 8. Rotatably positioned within the columns 8 are cylindrical shafts 9, which fit in collars 10 fixed to columns 8. Fixed to shafts 9 are platforms 11. The lower end of the cylindrical shaft 9 is connected to a crank arm 12 (Fig. 5), the two crank arms 12 being connected together by a link 13 on the underside of the base plate 1. Within the hollow shaft 9 is positioned a shaft 14 which has its upper end knurled and forced into a bushing 15 connected to a gear 16 which in turn is in mesh with a gear 17 having a bushing 18 fixed to a shaft 19, the latter being rotatably mounted in a small cylindrical casing 20 depending from the platform 11. In order to prevent the shaft 19 from falling out of position a set screw 21 is provided. The bushing 18 has a flat side which corresponds to the flat sides 22 in washers 23, 24 and 25. The washers 23 and 24 tightly hold a record separator 26, see Fig. 9, and the washers 24 and 25 tightly hold a small record supporting plate 27, which has one end thicker than the other end, and which extends beyond the casing 28 for the mechanism described.

From the above description it will be seen that the record separator 26 and the record supporting plate 27 move together with the shaft 19. Shaft 14 has attached thereto below the base plate 1 a crank arm 29. Crank arm 29 has a rectangular aperture therein which corresponds to a rectangular portion 30 of the shaft 14. The crank arm 12 has two spaced apertures which receive prongs projecting from the lower end of cylindrical shaft 9.

Link 13 has pivotally connected thereto at 31, a short link 32 pivotally connected at 33 to a lever 34. The lever 34 is fixed to stub shaft 35 rotatably supported and passing through the base plate 1 and having fixed thereto on the upper side of the base plate 1 an actuating arm 36. One end of the lever 34 is provided with upstanding flanges 37 and 38 adapted to engage respectively stops 39 and 40 to limit the movement of the lever 34, see Fig. 5. Stop 40 is fixed to the underside of base plate 1, while stop 39 is mounted on the end of the arm 41 pivoted at 42. Near the end of the arm 41 is pivotally attached a link 43 which is pivotally connected to an arm 44 which is attached to a stub shaft 45 passing through and rotatably mounted in the base plate 1 and connected to operating arm 46 on the upper side of the base plate 1.

Depending from the underside of the base plate 1 is a pin 47 which is adapted to engage either projection 48 or projection 49 of the arm 44 to limit the rotary movement thereof. Attached to a pin 50 on the arm 44 is a spring 51 which is attached to links 43 and 52 (see Fig. 5). Attached to arm 34 adjacent its connection to link 32 is a spring 53 which is fixed to a bracket 54, attached to the underside of the base plate 1. Fixed to link 13 is a bar 55 which has one end thereof provided with a laterally directed portion 56 provided with upstanding flanges 57 at the ends thereof, and having passing therethrough a small rod 58 encircled by a pair of compression springs 59 and 60, the springs being separated by the downturned end 61 of a bar 62 which has one end thereof provided with a slot 63, to receive the pin 64 projecting upwardly from an arm 65 (see Figs. 6, 16 and 19), which is pivoted at 66 to a plate 67, which has projecting therefrom a pin 68 adapted to engage the forked portions 69 and 70 on the arm 65 to limit the movements thereof in both directions.

A pin 71 projects from the arm 65 through an opening 72 in the plate 67 and into a slot 73a in the upper plate 73 (see Fig. 42) of a saddle which has upwardly extending pins 74 moving in guide slots 75 in the plate 67. The saddle has downwardly extending side arms 76 and 77 which support a pintle 78 upon which are pivotally mounted the arms 79 and 80 of a rocker having an upper plate 81. A torsion spring 82 encircles the pintle 78, one end of the spring engaging the arm 76 while the other end of the spring engages the arm 80 and tends to constantly urge the plate 81 downwardly. Attached to the underside of the plate is an angled member 83 having a downwardly projecting nose 84. Also mounted on the plate 81 is a bearing 85 rotatably supporting a shaft 86 to which is fixed a pawl 87. A torsion spring 88 connected to the pawl tends to normally move the pawl to a position extending below the lower surface of plate 81 as shown in Fig. 19.

Pivotally mounted in plate 67 is a shaft 89 rotatable in a bushing 90 which in turn is rotatably mounted in a second bushing 91 to which is attached a gear 92 (see Fig. 41). Fixed to the lower end of the shaft 89 is an arm 103, the movement of which in a clock-wise direction is limited by a pin 104 (see Fig. 18). Attached to the arm 103 at 105 is one end of a torsion spring 106 which has its other end attached at 107 to the gear 92. Adjacent the gear is a small pivotally mounted pawl 108 (Fig. 18) which engages the gear to prevent rotation thereof. By means of this arrangement the force exerted by the torsion spring can be adjusted when desired.

The nose 84 is adapted to project down into an opening 93 in an irregularly shaped arm 94 which is attached to shaft 95, to which is also attached a tone arm 96 (see Fig. 20). The arm 94 by means of the opening 93 presents two shoulders 97 and 98 which are adapted to engage the pawl 87. Shoulder 97 is for a 10″ record, while shoulder 98 is for a 12″ record (see Figs. 20, 21). The shaft 95 passes through the bushing 99, mounted on the base plate 1, shown in Fig. 21, the shaft 95 having a central passage which loosely receives a pin 100 having its upper end bearing on a small cup 101 attached to the tone arm 96 and the lower end thereof bearing upon a cam member 102. Embracing the shaft 95 is a collar 109 which is clamped to shaft 95 to rotate therewith. Pivoted to the collar 109 are a pair of ears 110 to which are attached one end of the tone arm. Pivotally mounted to the ears 110 at 110a are a pair of ears 111 which are connected to the member 112 the latter supporting the cup 101. A small plate 113 extends from member 112 beyond the ears 111, and between the plate 113 and the upper part of the tone arm 96 is positioned a compression spring 114, which tends to force the plate 113 downwardly. Ears 110 have integral therewith a small bracket 115a having a threaded aperture through which a screw 115 passes and bears against the underside of plate 113. By manipulating the screw 115 against the plate 113 the elevation of the tone arm can be adjusted.

The cam member 102 is fixed to shaft 116 which also has fixed thereto an arm 117 and another arm 118, said arms being spaced from each other by means of the bushing 119, the shaft being mounted upon a bracket 120 attached to the underside of the base plate 1 (see Fig. 20).

Pivotally connected to arm 118 is a rod 121 which has the other end thereof pivotally attached to a pin 122 depending from the underside of a large gear 123 (see Figs. 5, 6, 34). Also pivotally connected to the pin 122 is a rod 124 which has a slot 125 in which moves the upwardly extending pin 126 on the plate 94 (see Figs. 20 and 6). The rod 124 is adapted to also engage the pawl 87 at 87a (see Fig. 19) to move plate 81 upwardly to release projection 84 from plate 94. Pivotally connected to arm 117 is a link 127 (see Figs. 6 and 7) having a notch 128 adapted to engage a pin 129 projecting from link 130 connected to arms 29. At this point link 130 has attached thereto and spaced therefrom a short bar 130a to prevent link 127 from falling out of engagement with pin 129. The link 127 is pivotally connected at 131 to a link 132 which in turn is pivotally connected at 133 to a lever 134 pivoted at 135, the other end of the lever being pivotally connected at 136 to a link 137 which is pivotally connected at 138 to a member 139 which has a lost motion slot 140 in which rides a stop pin 141 to limit the movement of the member 139 and parts associated therewith. Member 139 has attached thereto a tension spring 142 which is attached to a bracket 143 fixed to the underside of the base plate 1.

The gear 123 is rotatably mounted on a plate 144, which is pivoted at 145 to base plate 1 (see Figs. 32, 33, 34), the gear being adapted to mesh with pinion 146 fixed to the drive shaft 2 of an electric motor 147. The gear 123 is rotatably mounted on the plate 144 at 148, the pivot pin 148 being surrounded by a bushing 149 which extends through a slot 150 on the base plate 1. Mounted on the upper side of plate 144 is a ratchet wheel 151 adapted to engage a spring controlled pawl 152. The ratchet wheel 151 is fixed to a stub shaft 153 to which is fixed a small pinion 154 in mesh with the gear wheel 123. By means of this arrangement the gear wheel is able to rotate only in one direction, rotation in the opposite direction being prevented by engagement of the pawl with the ratchet wheel. Pivoted to the underside of plate 144 is an arm 155 having a cam nose 156 adapted to engage a roller 157 on the upper side of gear 123. A spring 158 constantly urges the arm 155 inwardly (see Fig. 34) into engagement with the roller 157. As the gear rotates the cam nose will snap over roller 157 and tend to give the plate 144 and gear 123 an added "impulse" from engagement with the pinion 146.

Attached to the under side of the base plate 1 adjacent the gear 123 is an angle bracket 159 (see Figs. 22 and 23). Extending up from the ledge 160 of the bracket is a pin 161 on which is rotatably mounted a plate 162 having upstanding ears 163 supporting a pin 164 upon which are pivotally mounted ears 165 depending from an upper plate 166. A torsion spring 167 (Fig. 23) encircles the pin 164 and is connected to the upper plate 166 to normally urge the upper plate downwardly upon the lower plate. Pivoted to the lower plate at 168 is an arm 169 having an aperture 170 through which passes a post 171 projecting from plate 144 (see Figs. 22 and 34). Plate 162 as stated above is pivotally connected at 168 to the arm 169 the latter being pivotally connected to the post 171 and the plate and arm thus constitute a toggle. Depending from the underside of the upper plate 166 is a short lug 172 which is adapted to engage the nose 173 on rod 124 (see Fig. 34). When nose 173 engages the lug 172, the force applied by the rod 124 tends to move the upper plate and with it the lower plate 162 and straighten out the toggle, thus moving the gear 123 and plate 144 to a position to disengage gear 123 from the pinion 146 and hold it in such a position. When the upper plate is raised, the nose will be unable to engage the lug 172 and the gear 123 will be urged into mesh with the pinion 146 by force exerted by tension spring 174, which is attached to arm 169 and to the bracket 159.

As has been noted above phonograph records are manufactured with a final groove in the shape of a spiral in some cases and in other cases the final grooves are eccentric. With the eccentric groove the needle tends to oscillate and in order to accommodate the two types of final grooves on records the following mechanism is provided.

In Fig. 20, the arm 94 attached to the shaft to which is connected the tone arm 96 has on the other side thereof a projection 175 through which passes a screw 176 adapted to engage an upturned lip 177 of a lever 178 pivoted at 179 on a bracket 180 attached to the underside of base plate 1 (see Figs. 24 to 31). The other end of the lever 178 is provided with a pair of upturned lips 181 between which are positioned a downturned lip 182 integral with a lever 193 which is pivotally mounted at 194 to lever 183, pivoted at 184 to the bracket 180. Lever 183 has mounted thereon a roller 185 which is adapted to engage an arm 186 pivoted at 187, the arm having an upwardly projecting portion 188 which is adapted to engage the upper plate 166 and raise the same to disengage the lug 172 from the nose 173 of rod 124. When the phonograph record has a final groove in the shape of a spiral, the screw 176 will engage the lip 177 to cause the projection 188 to release the lug 172.

When the final grooves are eccentric the tone arm will oscillate and cause arm 94 to oscillate also; and accordingly arm 94 is provided with extension 189 having a plurality of teeth 190 thereon, which are adapted to engage a pawl 191 pivoted at 192 to a lever 193 pivoted at 194 to the lever 183. One end of the lever 193 is connected to the pawl 191 by tension spring 195 and the other end of the lever is connected by a tension spring 196 to an upturned lip 197 on lever 183.

As the tone arm reaches the end of the eccentric grooves of a phonograph record it tends to oscillate and the teeth 190 will engage the pawl 191. The movement of the teeth in one direction will be free over the pawl while movement of the teeth in an opposite direction will be resisted by the pawl 191 and cause the movement of levers 193 and 183 together to raise arm 186 to cause the projection 188 to raise the upper plate 166 and release the lug 172 from the nose 173.

As the teeth 190 move over the pawl 191 as shown in Fig. 30, the pawl moves counterclockwise on its pivot 192 against the action of the spring 195. But as the teeth 190 move in an opposite direction as shown in Fig. 31, the pawl is engaged with the ratchet teeth and in order to become disengaged has to move past its dead center. To do so a force is exerted which causes movement of plate 193 in a clockwise direction elongating spring 196 and carrying with it lever 183 (see Fig. 31).

As the rod 124 moves back and forth during the rotation of gear 123, at certain times it exerts a pull on the gear and at other times it tends to push the gear into engagement with the pinion 146. In order to insure that the gear will be engaged with the pinion regardless of the various forces which may be exerted, there is provided on the face of plate 144 an arm 198 pivoted at 199 (see Fig. 6) this arm having an upturned lug 200 adapted to engage the projection 201 on plate 144. The arm 198 is substantially triangular in shape and has the portion 202 thereof opposite the lug 200 attached to a tension spring 203 which in turn is attached at 204 to a fixed plate 205 upon which the arm is pivoted. As the rod 124 moves on the opposite side of the gear 123 the spring 203 forces the lug 200 against the projection 201 and urges the gear 123 into engagement with the pinion 146. When the rod 124 moves on the right-hand side of gear 123 (see Fig. 6), the rod will engage the upturned portion 202 of the arm 198 and tend to rotate the arm clockwise, see Fig. 6, and release the lug 200 from the projection 201, see Figs. 39 and 40.

In Fig. 35 is shown a counting mechanism which can be set to play a designated number of records. This mechanism is mounted on the base plate 1, on the underside thereof, (see Fig. 5) supported by a bracket 206. In Fig. 36, a shaft 207 passes through base plate 1 and has attached thereto above the base plate, a knob 208 having marked thereon a plurality of numbers to indicate the number of records to be played. The opposite end of the shaft is provided with a disc of insulating material 209 which carries thereon a metallic contact ring 210 having a break therein. This ring engages a pair of fingers 211 (see Fig. 5) which are connected by cords 212 and 213 which are connected to a source of electric power.

Attached to the shaft 207 are a pair of ratchet wheels 214 and 215, wheel 214 engaging an arm 216 to prevent rotation accidentally of the shaft while the ratchet wheel 215 engages the pawl 217 pivotally mounted at 218 to an arm 219 carrying an adjusting screw 220 which is adapted to engage at the completion of the playing of a record a lug 221 on the lever 94 (see Fig. 5). The arm 219 is pivoted at 222, see Fig. 35. When the lug 221 engages the screw 220 it moves the arm 219 to cause the pawl 217 to move the ratchet 215 one notch. This advances the position of the fingers 211 on the contact ring 210. This periodic advancing of the fingers continues until the desired number of records have been played at which time one of the fingers will lie on the insulating material 209 in the break of the contact ring and thus break the electrical circuit and stop the operation of the machine.

In operation, when it is desired to play a plurality of records, the records to be played are positioned on the record supporting plate 27. If it is desired to play 10" records the arm 36 is moved to place the supporting plates in the position shown in Fig. 12. In this case the record separator 26 will present one of its fingers 26b with a space between said arm and the record supporting plate 27 sufficient to accommodate the thickness of the 10" record. When it is desired to play the 12" record, the record supporting plate 27 is moved to the position shown in Fig. 9 in which case the portion 26a of the record separator 26 will be in position to separate the records, fingers 26a having a space greater than the spacing provided by fingers 26b. The switch 230 is moved to connect the machine with a source of electric power and an arm 231 positioned on the top of the base plate 1 is moved to cause a link 231a to move to cause the lug 231b thereon to engage projection 166a to raise plate 162 to release nose 173 from engagement with lug 172 and allow gear 123 to rotate. Rotation of the gear will cause rods 121 and 124 to move and carry with them the crank arms 29. Rotation of crank arm 29 will cause the rotation of shaft 14 and gear 15 which in turn rotates gear 17 to rotate the record separator 26 and record supporting plate 27 to allow a record to fall upon the turntable.

It will be noted that rotation of gear 17 causes separator 26 and record supporting plate 27 to rotate together. As they do so, the record supporting plate is moved to a position to release the lowermost record and the finger 26b (when a 10" record is being played) is moved above the lowermost record and engages the under surface of the next record above, (see Fig. 15). When the shaft 14 is rotated in the opposite direction to bring the parts back into position, as shown in Fig. 12, finger 26b is moved from engagement with the record and the latter falls upon the record supporting plate 27 in position to be subsequently released at the proper time.

In the meantime, cam 102 is rotated to lift pin 100 and raise the tone arm, at the same time the rod 124 engages pin 126 on plate 94 to move the tone arm to an out-of-the-way position. After the record has been deposited on the turntable, the tone arm is urged into playing position by the pressure exerted by the spring controlled arm 103, see Fig. 18. The tone arm then proceeds to play the record until the final groove is reached. If the final grooves are eccentric the teeth 190 will engage pawl 191 to raise plate 166 and release the lug 172 as above described. This then causes rotation of gear 123 and the associated mechanism to deposit another record. If the record has a final groove in the shape of a spiral, the screw 176 will engage a lip 177, to cause release of lug 172 as above described.

To change the apparatus to play a 12" record from a 10" record as above stated, the arm 36 is moved to rotate lever 34 which causes movement inwardly of link 32 pulling therewith the link 13, see Fig. 8. This rotates the arm 29 and hollow cylindrical shaft 9 to move the platforms 11 to a position shown in Fig. 9. During the rotation of cylindrical shaft 9 to move the platforms 11 in which is supported the shaft 19, the gears 17 have a planetary movement about the gears 16 which rotates record supporting plate 27 and record separator 26 to cause fingers 26a to be in a position to separate 12" records in the same manner as described above in connection with the separation of 10" records by fingers 26b, see Fig. 9. Should an additional space be required in order to freely remove a record, the record supporting plate 27 can be moved further to an out-of-the-way position by moving arm 46 which further acts upon link 32 to give a further movement of link 13 and rotation of arm 29.

When the arm 36 is moved to set the platforms 11 for 12" records, the bar 62 is moved longitudinally to act upon pin 64 and rotate arm 65 to cause pin 71 to move plate 73 (see Fig. 42) and the parts associated therewith to a position where pawl 87 passes through the opening 93 in arm 94 and in position to engage shoulder 98.

Immediately prior to the beginning of the playing of a record the rod 124 engages a pawl 87 at 87a to move plate 81 upwardly to disengage projecting nose 84 from plate 94 so that the tone arm can move freely inwardly towards the center of the record. The pawl 87 is mounted so that it will move in one direction against the action of the torsion spring 88 and movement in the opposite direction is prevented by the engagement of the pawl 87 with plate 81 so that the pawl and plate will move together when the rod 124 moves in a direction to cause disengagement of nose 84 from the plate 94.

It will be seen that one complete revolution of gear 123, oscillates the platform 11 to cause the rotation of the gears mounted thereon to release and deposit a record upon the turntable, to move the tone arm upwardly and to an out-of-the-way position, and then allow the tone arm to be moved to a predetermined position to start the playing of a record. These predetermined positions are determined by the shoulders in plate 94, which engage the pawl 87.

When it is desired to repeatedly play the same record, the arm 235, see Fig. 1, is moved to move link 137 to the right, see Fig. 8, and through the associated links to disengage the arm 127 from pin 129 on link 130. When the arm 127 is thus disengaged, the apparatus will continue to play the same record without the releasing of additional records from the platform 25.

To remove the 10" record from the turntable over the guide pin 5 the platforms 25 are moved to a position to accommodate a 12" record. In order to move the 12" record from the turntable the arm 46 is moved as above described to further rotate the arm 29 to give an additional space.

In order to hold the tone arm in an out-of-the-way position during the removal of records from the turntable or for otherwise adjusting the device, there is provided on the tone arm 96 a hook 236 which is adapted to engage an upstanding bar 237 (see Figs. 1, 2, 3). For shipping purposes to hold the tone arm tightly to prevent damage thereto, there is pivotally attached to the bar 237, a second bar 238, which can be moved to a position parallel to the bar 237 when the hook 236 is positioned over the bar 237, after which the two bars 237 and 238 are clamped tightly against the hook 236 by means of a screw 239.

The foregoing disclosure is to be regarded as descriptive and illustrative only and not as restrictive or limitative of the invention, of which, obviously, embodiments may be constructed, including many modifications, without departing from the spirit and scope of the invention, herein set forth and denoted in the appended claims.

Having thus described my invention, what I claim as new and desire to secure by Letters Patent is:

1. In an apparatus for automatically playing a plurality of phonograph records successively, a turntable, means for rotating the turntable, a base plate upon which the turntable is mounted, a pair of hollow cylindrical posts diametrically arranged with respect to the turntable and mounted on said base plate, each of said posts having a hollow cylindrical shaft rotatable therein, a small offset platform attached to the upper end of said cylindrical shaft, a second shaft passing through the cylindrical shaft and having a gear fixed to the upper end thereof, a stub shaft rotatably mounted in said platform and having fixed thereto a gear in mesh with said first gear, a record supporting plate fixed to rotate with said stub shaft, an S-shaped member fixed to and rotatable with said stub shaft, said member being positioned above the plate and having fingers spaced upwardly from the main body thereof substantially the thickness of a record, means to rotate said cylindrical shaft to move the platforms to two predetermined positions with respect to the turntable, a tone arm for playing a record upon the turntable, and means operatively connected to the second shaft and operatively associated with the tone arm to rotate the second shaft to rotate the plates and S-shaped members to allow a record to be deposited upon the turntable.

2. In an apparatus for automatically playing a plurality of phonograph records successively, a base plate, a turntable mounted on the base plate, means to rotate the turntable, a pair of hollow posts diametrically arranged with respect to the turntable and mounted on said base plate, each of said posts having a hollow cylindrical shaft rotatably mounted therein, an offset platform attached to said hollow cylindrical shaft, means to rotate the cylindrical shaft to move the platform to either of two predetermined positions with respect to the turntable, a second shaft positioned within the hollow cylindrical shaft and having attached to the upper end thereof a first gear, a stub shaft rotatably mounted on the platform and having a second gear in mesh with said first gear, a record supporting plate fixed to and rotatable with said stub shaft, said plate being adapted to support a plurality of records above the turntable, a record separator attached to said stub shaft above said record supporting plate, said record separator comprising a main body having spaced upwardly therefrom a pair of arcuate fingers, one of said fingers being spaced a greater distance from said supporting plate than the other finger, a tone arm mounted on the base plate for playing phonograph records, and means operatively connected to said gears and operatively associated with the tone arm to cause rotation of said gears to rotate said record separator to select a record and to move the record supporting plate to a position to allow a record to be deposited upon the turntable.

3. In an apparatus for automatically playing a plurality of phonograph records successively, a base plate, a turntable mounted above the base plate, means to rotate the turntable, a tone arm rotatably mounted on the base plate, a pair of posts diametrically arranged with respect to the turntable and mounted on said base plate, each of said posts having a small offset platform rotatably mounted thereon, means to move said platforms to either of two predetermined positions with respect to the turntable, a shaft mounted in said post and having fixed to the upper end thereof a gear, a second gear engaging said first gear and being fixed to a stub shaft rotatably mounted in said platform, a record supporting plate fixed to said stub shaft, a record separator fixed to said stub shaft, said record separator having a main body provided with a pair of separating fingers spaced therefrom substantially the thickness of a record, one of said fingers being spaced a greater distance from the record supporting plate than the other finger, and means operatively connected to said gears and operatively associated with the tone arm to cause rotation of said gears to rotate the plate and record separator to allow a record to be deposited upon the turntable.

4. In an apparatus for automatically playing a plurality of phonograph records successively, a base plate, a turntable rotatably mounted above the base plate, means to rotate the turntable, a pair of posts mounted on the base plate, each post having rotatably mounted thereon an offset platform, a stub shaft rotatably mounted on said platform, a record supporting plate fixed to said stub shaft, a record separator fixed to the stub shaft and positioned above the plate, said record separator having a pair of fingers spaced upwardly therefrom, one of said fingers being spaced a greater distance from the supporting plate than the other finger so that the record separator can be used to separate records of two different thicknesses, means to move the platform to either of two predetermined positions with respect to the turntable, means controlled by the movement of the platform to present a predetermined finger of the separator depending upon the position to which the platform is moved, a tone arm for the phonograph, and means operatively connected to the supporting plate and operatively associated with the tone arm to rotate the supporting plate and separator to allow a record to be deposited upon the turntable.

5. In a phonograph apparatus for playing a plurality of phonograph records successively, a base plate, a turntable mounted above the plate, means to rotate the turntable, a pair of posts diametrically arranged with reference to the turntable and mounted on the base plate, each of said posts having an offset platform rotatably mounted thereon, a first gear mounted on said platform and attached to a shaft extending through said post, a second gear in mesh with said first gear and fixed to a stub shaft rotatably mounted in said platform, a record supporting plate fixed to said stub shaft, a record separator fixed to said stub shaft, said separator having a main body with a pair of separating fingers on the opposite sides thereof, one of said fingers being spaced a greater distance from the supporting plate than the other finger so that the separator can accommodate records of two different thicknesses, means to rotate said platforms to either of two predetermined positions with respect to the turntable depending upon the diameter of the record being played, said second gear having a planetary movement about the first gear during the movement of the platform to place the proper separating finger in position to engage the records supported by the supporting plate, and means operable at the completion of the playing of a record to rotate the shaft in said post to cause rotation of said first and second gears to move said record separator between the lowermost record on the supporting plate and the next record above, and to move the supporting plate to a position to allow the lowermost record to be deposited on the turntable.

6. In an apparatus for playing a plurality of phonograph records successively, a base plate, a turntable rotatably mounted above the base plate, a pair of posts mounted on the base plate and diametrically arranged with respect to the turntable, each of said posts having a shaft passing therethrough, offset platforms rotatably mounted on said posts, a first gear attached to said shaft, a second gear in mesh with said first gear and fixed to a stub shaft rotatably mounted in said platform, a record supporting plate fixed to said stub shaft, a record separator fixed to said stub shaft and having a main body provided on the opposite sides thereof with a pair of fingers, one of said fingers being spaced a greater distance from the supporting plate than the other finger so that the separator can accommodate records of two different thicknesses, means to move the platform to either of two predetermined positions with respect to the turntable depending upon the diameter of the record being played, said second gear having a planetary movement about the first gear during the movement of said platform, to move the record separator into position to present the proper separating finger for the size of the record being played, and means operable at the completion of the playing of a record to rotate said first mentioned shaft to cause the rotation of the record separator to present a finger in engagement with the undersurface of the record above the lowermost record and to move the record supporting plate to a position to allow the lowermost record to be deposited on the turntable.

PLINY CATUCCI.